US 12,104,913 B2

United States Patent
Konishi et al.

(10) Patent No.: US 12,104,913 B2
(45) Date of Patent: Oct. 1, 2024

(54) ROUTE SEARCHING SYSTEM, ROUTE GUIDING SYSTEM, ROUTE SEARCHING PROGRAM, AND ROUTE GUIDING PROGRAM

(71) Applicant: AISIN CORPORATION, Kariya (JP)

(72) Inventors: Yasutaka Konishi, Saitama (JP); Yoichi Yamamura, Okazaki (JP); Takayuki Miyajima, Anjo (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/235,576

(22) Filed: Aug. 18, 2023

(65) Prior Publication Data

US 2023/0392939 A1 Dec. 7, 2023

Related U.S. Application Data

(63) Continuation of application No. 16/967,082, filed as application No. PCT/JP2018/047800 on Dec. 26, 2018, now abandoned.

(30) Foreign Application Priority Data

Mar. 13, 2018 (JP) ................................ 2018-045112

(51) Int. Cl.
G01C 21/34 (2006.01)
G01C 21/36 (2006.01)
(52) U.S. Cl.
CPC ..... *G01C 21/3461* (2013.01); *G01C 21/3617* (2013.01)

(58) Field of Classification Search
None
See application file for complete search history.

(56) References Cited

U.S. PATENT DOCUMENTS

| 2013/0261860 | A1 | 10/2013 | Oyama et al. |
| 2015/0046361 | A1 | 2/2015 | Williams et al. |
| 2018/0178807 | A1 | 6/2018 | Murata |
| 2019/0031186 | A1* | 1/2019 | Hardee ................ G05D 1/0088 |

FOREIGN PATENT DOCUMENTS

| JP | 2005-300209 A | 10/2005 |
| JP | 2008-292395 A | 12/2008 |
| JP | 2013-092921 A | 5/2013 |
| JP | 2013-210319 A | 10/2013 |

OTHER PUBLICATIONS

Feb. 19, 2019 International Search Report issued in International Patent Application No. PCT/JP2018/047800.

* cited by examiner

*Primary Examiner* — Hongye Liang
(74) *Attorney, Agent, or Firm* — Oliff PLC (57) ABSTRACT

A system that reduces the possibility of damaging items. A route searching system includes a type-of-item obtaining part that obtains a type of an item transported by a vehicle; a destination obtaining part that obtains a destination; and a route searching part that searches for a route that reaches the destination by selecting, based on the type of an item, a road with a low possibility of damaging the item on a priority basis over a road with a high possibility of damaging the item.

5 Claims, 4 Drawing Sheets

ROUTE SEARCHING SYSTEM, ROUTE GUIDING SYSTEM, ROUTE SEARCHING PROGRAM, AND ROUTE GUIDING PROGRAM

This is a Continuation of U.S. patent application Ser. No. 16/967,082 filed Aug. 3, 2020, which in turn is a U.S. National Phase Application of International Patent Application No. PCT/JP2018/047800 filed Dec. 26, 2018, which claims the benefit of and priority to Japanese Patent Application No. 2018-045112 filed Mar. 13, 2018. The disclosure of the prior applications is hereby incorporated by reference herein in its entirety.

TECHNICAL FIELD

The preferred embodiment relates to a route searching system, a route guiding system, a route searching program, and a route guiding program.

BACKGROUND ART

Conventionally, there is known a technique for identifying a route for freight transport, etc. For example, Patent Literature 1 discloses a technique in which in order to identify roads whose passage is limited by the sizes of vehicles and the types of loads, the sizes of vehicles, the types of loads, etc., are recorded in travel track record data so as to be associated with each other. In this configuration, by superimposing and displaying the travel track record data for each size of a vehicle and each type of load on a map, a route based on the size of a vehicle and the type of an item can be selected.

CITATIONS LIST

Patent Literature

Patent Literature 1: JP 2013-92921 A

SUMMARY OF INVENTION

Technical Problems

When items are loaded on a vehicle, there is a need to prevent damage to the items. However, the conventional technique does not take into account the risk of damage to items, and thus, it has been difficult to perform management for preventing damage to items.

The preferred embodiment is made in view of the above-described problem, and provides a technique for reducing the possibility of damaging items.

Solutions to Problems

To provide the above-described technique, a route searching system includes: a type-of-item obtaining part that obtains a type of an item transported by a vehicle; a destination obtaining part that obtains a destination; and a route searching part that searches for a route that reaches the destination by selecting, based on the type of an item, a road with a low possibility of damaging the item on a priority basis over a road with a high possibility of damaging the item.

In addition, to provide the above-described technique, a route searching program causes a computer to function as: a route obtaining part that obtains a route for reaching a destination of a vehicle, the route being searched by selecting, based on a type of an item transported by the vehicle, a road with a low possibility of damaging the item on a priority basis over a road with a high possibility of damaging the item; and a route guiding part that provides guidance on the route.

Furthermore, to provide the above-described technique, a route guiding system includes: a route obtaining part that obtains a route for reaching a destination of a vehicle, the route being searched by selecting, based on a type of an item transported by the vehicle, a road with a low possibility of damaging the item on a priority basis over a road with a high possibility of damaging the item; and a route guiding part that provides guidance on the route.

Furthermore, to provide the above-described technique, a route guiding program causes a computer to function as: a route obtaining part that obtains a route for reaching a destination of a vehicle, the route being searched by selecting, based on a type of an item transported by the vehicle, a road with a low possibility of damaging the item on a priority basis over a road with a high possibility of damaging the item; and a route guiding part that provides guidance on the route.

Namely, according to the route searching system and the route searching program, a route that reaches a destination can be obtained using a road with a low possibility of damaging an item while avoiding a road with a high possibility of damaging the item. Therefore, by allowing the vehicle to travel along the route, the possibility of damaging the item can be reduced. In addition, according to the route guiding system and the route guiding program, the vehicle can be guided to reach a destination by using a road with a low possibility of damaging an item while avoiding a road with a high possibility of damaging the item. Therefore, the possibility of damaging the item in the course before reaching the destination can be reduced.

DESCRIPTION OF EMBODIMENTS

Here, embodiments of the preferred embodiment will be described in the following order:

(1) System configurations;
(1-1) Configuration of a route guiding system;
(1-2) Configuration of a route searching system;
(1-3) Configuration of an operation manager terminal;
(2) Route search process; and
(3) Other embodiments.

(1) System Configurations

Figure 1:
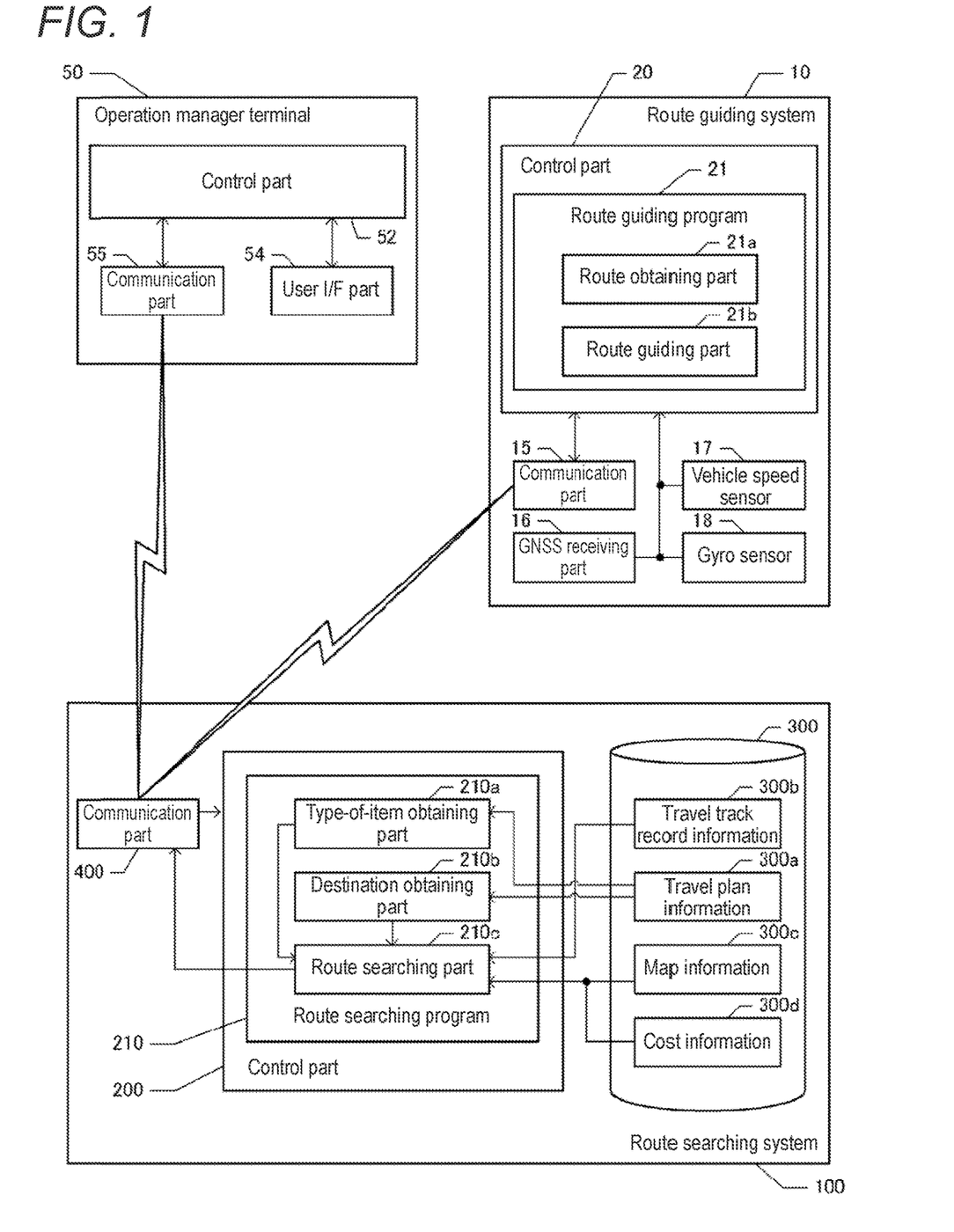
FIG. 1 is a block diagram of a route searching system and a route guiding system.

FIG. 1 is a block diagram showing the configurations of a route guiding system 10 and a route searching system 100 according to the preferred embodiment. In the present embodiment, the route searching system 100 is used when items are transported by a plurality of vehicles (in the present embodiment, transport vehicles such as trucks).

In the present embodiment, the route searching system 100 cooperates with route guiding systems 10 used by vehicles and an operation manager terminal 50. The operation manager terminal 50 is a terminal used by an operator that provides item transport services using a plurality of vehicles, and is mainly used to perform operation management of the plurality of vehicles. One or more operation manager terminals 50 are prepared and are, for example, set up at an operator's base, etc. The route guiding systems 10 are used by a plurality of vehicles, respectively, and may be installed on the vehicles, or portable terminals may be carried and used in the vehicles as the route guiding systems 10.

(1-1) Configuration of a Route Guiding System:

In the present embodiment, an operation manager receives transport requests from senders of items and decides on transport plans for the items, and identifies travel plans for each of a plurality of vehicles. The travel plans include at least items for each vehicle and destinations which are item transport destinations. Since the destinations are item transport destinations, unloading work is performed at the destinations.

Needless to say, a plurality of items may be loaded on a single vehicle. In addition, there may be a plurality of destinations, and when a plurality of items are unloaded at different points, each point can serve as a destination. In addition, when a new item is collected in the course of transport, a point at which the item is loaded can serve as a destination. Furthermore, when transport of items is completed and a vehicle returns to its base with no item loaded thereon, the base can serve as a destination. Furthermore, the travel plans may also include various other information and may include, for example, due dates for transport of items to the destinations.

At any rate, in the present embodiment, each vehicle needs to travel according to a travel plan for the vehicle. The route guiding system 10 according to the present embodiment is a terminal for providing guidance on guiding the vehicle along a route, according to a travel plan. The route guiding system 10 includes a control part 20 including a CPU, a RAM, a ROM, etc.; a recording medium which is not shown; a communication part 15; a GNSS receiving part 16; a vehicle speed sensor 17; and a gyro sensor 18. The control part 20 can execute a route guiding program 21 (not shown) stored in the recording medium or the ROM which is not shown.

The recording medium which is not shown records information indicating a route that the vehicle is to travel to perform transport according to a travel plan, and map information. The map information is information used to, for example, identify a vehicle location and a guidance-target facility, and includes node data representing, for example, the location of a node set on a road on which the vehicle travels, shape interpolation point data representing, for example, the location of a shape interpolation point for identifying the shape of a road between nodes, link data representing a link between nodes, data representing, for example, the location of a road and ground objects present around the road, and the like. Data representing a ground object is associated with an attribute of the ground object.

The GNSS receiving part 16 is a device that receives Global Navigation Satellite System signals, and receives radio waves from navigation satellites and outputs a signal for calculating a current location of the vehicle through an interface which is not shown. The control part 20 obtains the signal and thereby obtains the current location of the vehicle. The vehicle speed sensor 17 outputs a signal corresponding to the rotational speed of wheels provided on the vehicle. The control part 20 obtains the signal through an interface which is not shown, and thereby obtains vehicle speed. The gyro sensor 18 detects angular acceleration of the vehicle for a turn in a horizontal plane, and outputs a signal corresponding to the orientation of the vehicle. The control part 20 obtains the signal and thereby obtains a traveling direction of the vehicle. The vehicle speed sensor 17, the gyro sensor 18, and the like, are used to identify a travel path of the vehicle, and in the present embodiment, a current location is identified based on the location of departure and travel path of the vehicle, and the current location of the vehicle which is identified based on the location of departure and travel path is corrected based on an output signal from the GNSS receiving part 16.

The communication part 15 includes a circuit that performs communication with other devices. The control part 20 can perform communication with the route searching system 100 through the communication part 15. The control part 20 obtains a route transmitted from the route searching system 100 and provides guidance on guiding the vehicle according to the route, by functions of the route guiding program 21.

Namely, when the control part 20 executes the route guiding program 21, the control part 20 functions as a route obtaining part 21*a* and a route guiding part 21*b*. The route obtaining part 21*a* is a program module for allowing the control part 20 to perform a function of obtaining a route transmitted from the route searching system 100. Namely, the control part 20 performs communication with the route searching system 100 through the communication part 15 to obtain information indicating a route searched by the route searching system 100, by the function of the route obtaining part 21*a*.

The route guiding part 21*b* is a program module for allowing the control part 20 to perform a function of providing guidance on a route. Namely, the control part 20 allows a user I/F part (a display, a speaker, etc.) which is not shown to display a map, and displays a route displayed on the map in an emphasized manner, by the function of the route guiding part 21*b*. Then, the control part 20 guides the vehicle to travel on the route by allowing the user IF part to output audio, etc., showing a traveling direction at an intersection, etc.

In the present embodiment, a route created by the route searching system 100 is a route searched by selecting a road with a low possibility of damaging items loaded on the vehicle on a priority basis over a road with a high possibility of damaging the items (details will be described later). Therefore, by a user of the route guiding system 10 (a driver of the vehicle) allowing the vehicle to travel along the route, the items can be transported to a destination with a low possibility of occurrence of damage to the items.

(1-2) Configuration of a Route Searching System:

The route searching system 100 includes a control part 200 including a CPU, a RAM, a ROM, etc., a recording medium 300, and a communication part 400. The communication part 400 includes a circuit that gives and receives information to/from the route guiding systems 10 and the operation manager terminal 50, and the control part 200 can perform communication with the route guiding systems 10 and the operation manager terminal 50 through the communication part 400. In addition, the control part 200 can execute a program stored in the recording medium 300 or the ROM in the control part 200. In the present embodiment, as the program, a route searching program 210 can be executed.

In addition, the recording medium 300 records travel plan information 300*a*, travel track record information 300*b*, map information 300c, and cost information 300d. The travel plan information 300a is information indicating travel plans for each vehicle, and the operation manager makes travel plans for each vehicle using the operation manager terminal 50, and transmits the travel plans for each vehicle to the route searching system 100 at arbitrary timing such that the travel plans for each vehicle are associated with identification information of each vehicle. Namely, the control part 200 obtains travel plan information 300a indicating the travel plans through the communication part 400, and records the travel plan information 300a in the recording medium 300. When the travel plan information 300a is recorded, items to be transported and transport destinations of each item are being identified for each vehicle.

The travel track record information 300b is information indicating operation performed by a vehicle that uses a route guiding system 10. Namely, in the vehicle, operation performed by the vehicle and accidents occurred in the vehicle are detected based on the vehicle speed sensor 17 and various types of sensors which are not shown. Then, in the vehicle, when operation that is likely to cause damage to items has been performed or when an accident has occurred, a history thereof is collected and transmitted as travel track record information from the vehicle to the route searching system 100. The travel track record information includes a history of operation performed by the vehicle, identification information of the vehicle, and the types of items (which may be items themselves) loaded on the vehicle.

When the travel track record information is transmitted, the control part 200 obtains the travel track record information through the communication part 400, and records the travel track record information in the recording medium 300 such that the travel track record information is associated with the identification information of the vehicle (travel track record information 300b). Note that the identification information of the vehicle is information for identifying the vehicle that is a sender of the travel track record information 300b. Needless to say, the identification information may be identified for each driver. Table 1 shows an example of travel track record information 300b of a vehicle with given identification information.

TABLE 1

| Travel track record: time | Exceeding of speed limits on bad roads | Sudden acceleration/ deceleration on steep slopes | Sudden steering at sharp bends | Accidents |
|---|---|---|---|---|
| Valuables: 1000 | 48 | 22 | 5 | 0 |
| Precision equipment: 2000 | 50 | 40 | 10 | |
| General items: 3000 | 60 | 54 | 12 | 1 |

As shown in Table 1, the travel track record information 300b is information in which a conveyance track record (conveyance time) for each type of items (variables, precision equipment, and general items) is associated with the number of occurrences of operation that is likely to cause damage to items. For example, in the vehicle shown in Table 1, the transport track record for valuables is 1000 hours. In addition, the number of occurrences is counted for each of the exceeding of speed limits on bad roads, sudden acceleration or sudden deceleration on steep slopes, sudden steering at sharp bends, and accidents, and is associated with a conveyance track record. For example, the number of occurrences of the exceeding of speed limits on bad roads is 48 in 1000 hours of transport of valuables.

Note that whether a road is a bad road can be identified by determining, for example, whether up-down acceleration is greater than or equal to a threshold value or whether the frequency of up-down vibration is greater than or equal to a threshold value, using an acceleration sensor mounted on the vehicle. Whether the vehicle exceeds the speed limit can be determined by whether vehicle speed is greater than or equal to a threshold value. The threshold values for determining whether a road is a bad road and whether the vehicle exceeds the speed limit may change depending on the type of an item.

Whether a slope is a steep slope can be identified by, for example, determining whether the slope of a road (a slope angle with flat ground being 0°) is greater than or equal to a threshold value, based on map information including altitude information and slope information which are prepared in advance. Whether there is sudden acceleration or sudden deceleration can be implemented by a configuration in which, for example, whether a change in speed per time is greater than or equal to a predefined magnitude is determined by output from the vehicle speed sensor, the acceleration sensor, etc.

Whether a bend is a sharp bend can be identified by, for example, determining whether the curvature of the bend in a road is greater than or equal to a threshold value, based on map information including road shapes and curvature information which are prepared in advance. Whether sudden steering is performed can be implemented by a configuration in which, for example, whether a change in the angle of a tire or a change in the traveling direction of the vehicle per time is greater than or equal to a predefined magnitude is determined by output from a sensor, a gyro sensor, an acceleration sensor, etc., provided on a steering. For the occurrence of an accident, for example, a configuration can be adopted in which the occurrence of an accident is identified by a report by a driver when an accident has occurred, various types of sensors (a sound sensor, a vibration sensor, etc.) provided on the vehicle, various types of sensors provided on a road, whether there is congestion of an unknown cause, statistics by public agencies, etc.

The map information 300c is the same information as the map information recorded in the recording medium of the route guiding system 10, and includes node data, shape interpolation point data, link data, data representing, for example, the location of a road and ground objects present around the road, etc. Data representing a ground object includes an attribute of the ground object (the type of facility, etc.). Note that in the present embodiment, altitude values of points at every certain distance on a road section are included in link data. Thus, a slope of a road section can be identified by changes in the altitude values of a plurality of points.

In addition, link data representing a road section with poor road surface conditions is associated with information indicating that it is a bad road. Whether a road is a bad road is identified in advance and included in the map information 300c. Whether a road is a bad road may be identified in various modes. For example, it is possible to adopt a configuration in which when a vehicle including an acceleration sensor, etc., detects a change in acceleration that results from bumps and dips in a road surface and thereby detects a change in acceleration, vibration, or the like, that exceeds a threshold value, it is determined that a road is a bad road. The subject of determination may be a control part included in the vehicle or may be the route searching system 100. In the latter case, detection data obtained by a sensor is collected from the vehicle, and the route searching system 100 analyzes the data and thereby identifies a bad road.

In addition, in the present embodiment, link data representing a road section with a relatively high probability of occurrence of an accident (e.g., the number of occurrences of accidents per unit period is greater than or equal to a threshold value) is associated with information indicating a high accident rate. Whether the probability of occurrence of an accident is relatively high may be identified in various modes. For example, the occurrence of an accident is identified by a report by a driver when an accident has occurred, various types of sensors (a sound sensor, a vibration sensor, etc.) provided on the vehicle, various types of sensors provided on a road, whether there is congestion of an unknown cause, statistics by public agencies, etc. When the occurrence of accidents is identified, for example, the probability of occurrence of an accident for each road section can be identified by the number of occurrences of accidents per unit period, etc., and it is possible to adopt, for example, a configuration in which whether the probability of occurrence of an accident is relatively high is identified by comparing the probability of occurrence with a threshold value. At any rate, a road section with a relatively high probability of occurrence of an accident is identified in advance, and information indicating a high accident rate is associated with link data.

The cost information 300d is information indicating a cost for each road section indicated by the map information 300c, and a cost used upon selecting a route is associated with link data representing a road section. Note that in the present embodiment, costs are defined such that the larger the cost of a road section, the lower the possibility of selecting the road section as a route. Note also that in the present embodiment, a default value of a cost for each road section which is identified by the distance of the road section, etc., is defined and serves as cost information 300d. The default value can be corrected by multiplying the default value by a cost coefficient.

Namely, by multiplying a cost of a road section by a cost coefficient greater than 1, the road section can be made less likely to be selected as a route than a default. In addition, by multiplying a cost of a road section by a cost coefficient smaller than 1, the road section can be made more likely to be selected as a route over a case in which a search is performed using a default cost.

In the present embodiment, the cost coefficient is defined for each type of items and included in cost information 300d. Namely, in the present embodiment, it is assumed that by selecting a route, the possibility of damaging items is reduced. Hence, in the present embodiment, the types of items are classified according to how easily the items are damaged. Specifically, the types of items are classified into valuables, precision equipment, and general items. The valuables include artwork, craftwork, etc., such as glass and pottery, that are likely to be damaged by vibration, etc., upon transport. The precision equipment includes computers, office machinery, etc., that are likely to be damaged by vibration, etc., upon transport. The general items include items other than those described above and are, for example, items packed in boxes with no "handle with care" instruction.

In the present embodiment, an item that is more easily damaged is associated with a larger cost coefficient value. In addition, a factor that is highly likely to cause damage to items is associated with a larger cost coefficient value. Table 2 is a diagram showing an example of cost coefficients.

TABLE 2

| Type of item | Bad road | Steep slope | Sharp bend | High accident rate |
| --- | --- | --- | --- | --- |
| Valuables | 1.7 | 1.5 | 1.5 | 1.2 |
| Precision equipment | 1.8 | 1.2 | 1.2 | 1.1 |
| General items | 1.0 | 1.0 | 1.0 | 1.0 |

For example, in road sections with a steep slope, a sharp bend, and a high accident rate, the valuables are more likely to be damaged than the precision equipment, and the precision equipment is more likely to be damaged than the general items. In a road section of a bad road, the precision equipment is more likely to be damaged than the valuables, and the valuables are more likely to be damaged than the general items. In Table 2, such conditions are reflected, and an item that is more easily damaged has a larger cost coefficient value. For example, when a comparison is made in terms of a bad road, the precision equipment has a larger cost coefficient than the valuables, and the valuables have a larger cost coefficient than the general items. Furthermore, since the possibility of damaging items varies depending on the factor such as a bad road and a steep slope, the cost coefficient is defined for each factor.

In the present embodiment, the route searching program 210 includes a type-of-item obtaining part 210a, a destination obtaining part 210b, and a route searching part 210c. The type-of-item obtaining part 210a is a program module that allows the control part 200 to perform a function of obtaining a type of an item transported by a vehicle. Namely, the control part 200 searches for a route that each vehicle is to travel, for example, at predefined timing such as before the start of business of the day. To do so, the control part 200 identifies types of items transported by each vehicle, based on identification information of the vehicles. Namely, since travel plan information 300a is information in which the type of an item and a destination are associated with identification information of a vehicle, the control part 200 obtains, based on the identification information, the type of an item transported by a route-search-target vehicle.

The destination obtaining part 210b is a program module that allows the control part 200 to perform a function of obtaining a destination. Namely, the control part 200 obtains a destination of a route-search-target vehicle, based on identification information of the vehicle by referring to travel plan information 300a.

The route searching part 210c is a program module that allows the control part 200 to perform a function of searching for a route that reaches a destination by selecting, based on the type of an item, a road with a low possibility of damaging the item on a priority basis over a road with a high possibility of damaging the item. Namely, the control part 200 searches for a route that allows each vehicle to reach its destination, based on the map information 300c. Note that a point of departure of a vehicle is known and, for example, a base, etc., of a transport company can serve as a point of departure, but needless to say, when the point of departure varies between vehicles, a route from a point of departure to a destination may be searched for each vehicle or a current location of each vehicle may serve as a point of departure.

A route search is performed based on the cost information 300d. Namely, the control part 200 obtains a cost of a determination-target road section for which a determination is made as to whether to select the road section as a road section connected to a node, with a point of departure of each vehicle serving as a starting-point node. The cost has a default value indicated by cost information 300d or a value obtained by multiplying the default value by a cost coefficient. The cost of the determination-target road section may be calculated in advance or may be calculated upon determining whether to select the road section as a route.

Upon calculating a cost of a cost-calculation-target road section, the control part 200 identifies which one of a bad road, a steep slope, a sharp bend, and a high accident rate the cost-calculation-target road section corresponds to, by referring to the map information 300c. For example, when link data representing the cost-calculation-target road section is associated with information indicating a bad road, the control part 200 determines that the road section is a bad road. In addition, the control part 200 identifies a slope based on the altitude values of the cost-calculation-target road section, and determines that the slope is a steep slope when the magnitude of the slope is greater than or equal to a threshold value.

Furthermore, the control part 200 identifies, based on the node data and shape interpolation point data of the cost-calculation-target road section, the curvature of the road section (the maximum value of the curvature) and determines that the road section has a sharp bend when the magnitude of the curvature is greater than or equal to a threshold value. Furthermore, in the control part 200, when the link data representing the cost-calculation-target road section is associated with information indicating a high accident rate, the control part 200 determines that the road section has a high accident rate.

When the cost-calculation-target road section corresponds to any one of a bad road, a steep slope, a sharp bend, and a high accident rate, the control part 200 obtains, based on the cost information 300d, a cost coefficient associated with the corresponding one and associated with the type of an item transported by the vehicle. Then, the control part 200 considers a value obtained by multiplying a default cost of the cost-calculation-target road section by the cost coefficient, as the cost of the cost-calculation-target road section. When the cost-calculation-target road section does not correspond to any of a bad road, a steep slope, a sharp bend, and a high accident rate, the control part 200 obtains a default cost based on the cost information 300d, and considers the default cost as the cost of the cost-calculation-target road section. Note that when the cost-calculation-target road section corresponds to more than one of a bad road, a steep slope, a sharp bend, and a high accident rate, for example, the largest cost coefficient may be selected or a cost coefficient may be identified by the product, sum, etc., of a plurality of cost coefficients.

In the present embodiment, the cost can be adjusted by other elements in addition to the type of an item. The other elements can include the distance of a road section, average travel time on the road section, etc., but needless to say, other elements may be included. In the present embodiment, a cost adjustment based on a vehicle driver's driving skill is included. Namely, a skill of reducing a load on an item in response to a factor (a bad road, etc.) that causes damage to the item is lower for a driver with a low driving skill than a driver with a high driving skill. Therefore, it is estimated that the possibility of damaging the item is relatively higher for the driver with a low driving skill than the driver with a high driving skill.

Hence, in the present embodiment, by the function of the route searching part 210c, when a vehicle driver has a low driving skill, the control part 200 reduces the possibility of selecting a road with a high possibility of damaging items as a route over when a vehicle driver has a high driving skill.

In the present embodiment, drivers that drive vehicles are determined in advance, and a driving skill of a driver of each vehicle can be determined based on travel track record information 300b of each vehicle.

Namely, in travel track record information 300b, a conveyance track record (conveyance time) for each type of items is associated with the number of occurrences of operation that is likely to cause damage to items. Hence, the control part 200 considers, by referring to the travel track record information 300b, that the larger the number of occurrences of operation that is likely to cause damage to items in unit conveyance time, the lower the driving skill. For example, in an example shown in Table 1, since the number of occurrences of exceeding the speed limits on bad roads by the driver is 48, it is considered that the number of occurrences per unit conveyance time is 0.048.

The control part 200 adjusts the cost coefficient based on such a number of occurrences per unit conveyance time. Specifically, the control part 200 compares the number of occurrences per unit conveyance time with a threshold value, and makes an adjustment such that the lower the vehicle driver's driving skill, the larger the cost coefficient. Table 3 shows an example of threshold values.

TABLE 3

|  | Third threshold value: ×1.5 | Second threshold value: ×1.3 | First threshold value: ×1.1 |
| --- | --- | --- | --- |
| Exceeding of speed limits on bad roads | 0.06 | 0.04 | 0.02 |
| Sudden acceleration/deceleration | 0.05 | 0.03 | 0.02 |
| Sudden steering | 0.04 | 0.03 | 0.02 |
| Number of accidents | 0.001 | 0.0001 | 0.00001 |

In Table 3, three threshold values are defined for each operation that is likely to cause damage to items. For example, for the exceeding of speed limits on bad roads, a first threshold value is 0.02, a second threshold value is 0.04, and a third threshold value is 0.06. The control part 200 identifies, as a driver's driving skill, the number of occurrences of operation that is likely to cause damage to items in unit conveyance time, based on the type of an item transported by a vehicle by referring to travel track record information 300b.

Then, the control part 200 identifies a threshold value based on a factor for a cost-calculation-target road section, and compares the threshold value with the driving skill, and when the driving skill is greater than or equal to the third threshold value, the cost coefficient is multiplied by a factor of 1.5. When the driving skill is greater than or equal to the second threshold value and smaller than the third threshold value, the control part 200 multiplies the cost coefficient by a factor of 1.3. When the driving skill is greater than or equal to the first threshold value and smaller than the second threshold value, the control part 200 multiplies the cost coefficient by a factor of 1.1. When the driving skill is smaller than the first threshold value, the control part 200 does not adjust the cost coefficient based on the driving skill.

For example, when the cost-calculation-target road section is a bad road and the driver's driving skill is 0.048, if the threshold values are defined as shown in Table 3, then the control part 200 determines that 0.048 is greater than or equal to the second threshold value and smaller than the third threshold value. Thus, the cost coefficient is multiplied by a factor of 1.3. Then, the control part 200 considers a value obtained by multiplying a default cost of the costcalculation-target road section by the cost coefficient, as the cost of the cost-calculation-target road section. Note that Tables 1 and 3 are examples, and for example, driving skills may not be defined for each type of items and Table 1 may be defined for all items in a shared manner.

When costs are obtained, the control part 200 searches for a route from a point of departure to a destination by a known technique, e.g., Dijkstra's algorithm, based on the costs. When routes are searched, the control part 2(x) transmits the routes of respective vehicles to the route guiding systems 10 used by the respective vehicles, by the function of the route searching part 210c. Namely, the control part 200 performs communication with each of the plurality of vehicles through the communication part 400, and identifies sending destinations for the routes of the respective vehicles based on identification information of the respective vehicles. Then, the control part 200 transmits the routes of the respective vehicles to the route guiding systems 10 of the respective vehicles.

When the routes of the respective vehicles are transmitted to the route guiding systems 10 of the respective vehicles in the above-described manner, each route guiding system 10 provides guidance on the route of a corresponding vehicle. In the present embodiment, the route searching system 100 searches for a route based on cost information 300d. For the cost information 300d, a cost is calculated by multiplying a default cost value by a cost coefficient determined based on the type of an item.

For the cost coefficient, for example, as shown in Table 2, an item that is more easily damaged is associated with a larger cost coefficient value. When a route is searched by multiplying a default cost by such a cost coefficient, in a case of an easily damaged item, the possibility of selecting a road with a high possibility of damaging the item as a route is reduced over a case of an item that is less likely to be damaged. Therefore, according to the present embodiment, a route that reaches a destination is obtained by using a road with a low possibility of damaging items while avoiding a road with a high possibility of damaging items, and guidance on the route can be provided. Hence, a vehicle can be guided to reach a destination by using a road with a low possibility of damaging items while avoiding a road with a high possibility of damaging items. Therefore, the possibility of damaging the items in the course before reaching the destination can be reduced.

In addition, in the present embodiment, in a case of a low driving skill, the possibility of selecting a road with a high possibility of damaging items as a route is reduced over a case of a high driving skill. Therefore, according to the present embodiment, even if a driver has low driving skills, the possibility that the driver can complete transport without damaging items increases.

(1-3) Configuration of an Operation Manager Terminal:

The operation manager terminal 50 is a terminal used by an operation manager to input travel plans for each vehicle. The operation manager terminal 50 includes a control part 52 including a CPU, a RAM, a ROM, etc.; a recording medium which is not shown; a user I/F part 54; and a communication part 55. The control part 52 can execute a program (not shown) stored in the recording medium or the ROM which is not shown.

The user I/F part 54 includes an input part that accepts input performed by the operation manager; and an output part that displays information, and can display arbitrary information on the output part. Needless to say, an output mode of the output part is not limited to display, and may be audio output, etc. The communication part 55 includes a circuit that performs communication with other devices, and the control part 52 can perform communication with the route searching system 100 through the communication part 55.

The control part 52 can display an interface screen for inputting travel plans for each vehicle on the output part of the user I/F part 54 by a function of the program which is not shown. The operation manager can input items to be loaded on each vehicle, destinations, etc., while visually checking identification information of the vehicles on the interface screen.

Namely, the control part 52 accepts items to be loaded on each vehicle, based on operation manager's operations performed using the input part of the user I/F part 54. In addition, the control part 52 accepts destinations, etc., based on operation manager's operations performed using the input part of the user I/F part 54. Then, the control part 52 associates the items to be loaded on each vehicle and the destinations with identification information of each vehicle, and transmits the identification information to the route searching system 100 through the communication part 55. Note that although, in the present embodiment, information indicating items is transmitted, information indicating the types of items may be transmitted. In the above-described configuration, by the operation manager specifying the type of an item and a destination, a route with a low possibility of damaging the item is searched and guidance on the route is provided. Therefore, a reduction in damage to items on a plurality of vehicles can be very easily achieved.

(2) Route Search Process

Figure 2:
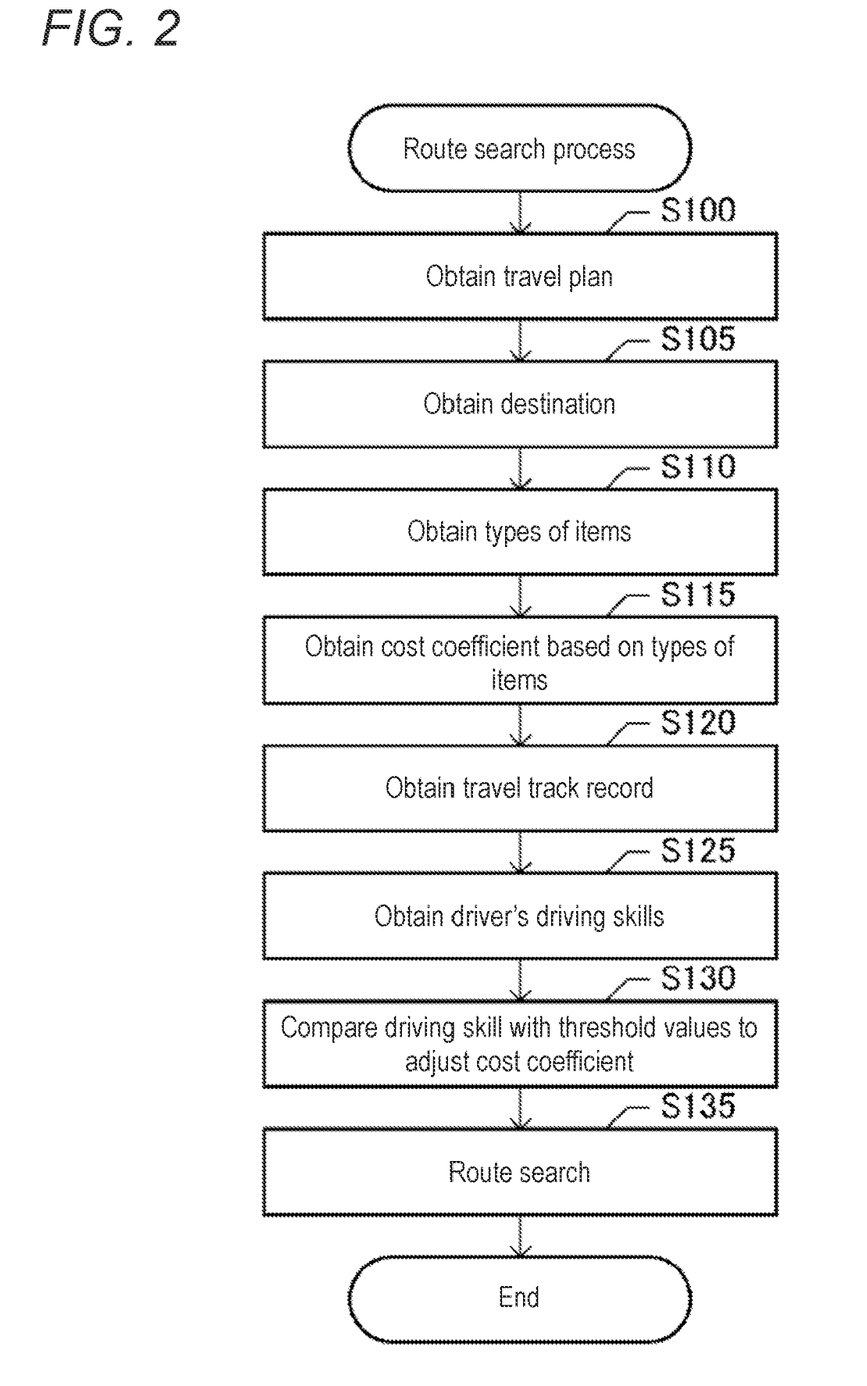
FIG. 2 is a flowchart showing a route search process.

Next, a route search process performed by the control part 200 will be described. The operation manager creates in advance travel plan information 300a indicating travel plans for each vehicle, using the operation manager terminal 50, and transmits the travel plan information 300a to the route searching system 100. The route searching system 100 obtains the travel plan information 300a through the communication part 400 and records the travel plan information 300a in the recording medium 300. In a vehicle that uses a route guiding system 10, exceeding of speed limits on bad roads, sudden acceleration (and sudden deceleration) on steep slopes, sudden steering at sharp bends, and occurrence of accidents are detected in the course of vehicle's traveling, and are compiled as travel track record information 300b. The travel track record information 300b is transmitted to the route searching system 100 from the vehicle, and the route searching system 100 obtains the travel track record information 300b through the communication part 400 and records the travel track record information 300b in the recording medium 300.

The route searching system 100 performs a route search process with the travel plan information 300a and the travel track record information 300b being recorded in the recording medium 300 in the above-described manner and map information 300c and cost information 300d being defined in advance and recorded in the recording medium 300. Note that the route search process can be performed for each of the vehicles managed by the operation manager. Although here the route search process is described using a given vehicle as a route-search-target vehicle, when routes are searched for each of a plurality of vehicles, a route search process is performed for each vehicle by referring to travel plan information 300a and travel track record information 300b of each vehicle based on identification information of the vehicles.

When a route search process starts, the control part 200 obtains a travel plan (step S100). Namely, the control part 200 obtains travel plan information 300*a* associated with identification information of a route-search-target vehicle from the recording medium 300, and records the travel plan information 300*a* in the RAM which is not shown, etc.

Then, by the function of the destination obtaining part 210*b*, the control part 200 obtains a destination (step S105). Namely, the control part 200 obtains a destination of the vehicle by referring to the travel plan information 300*a* obtained at step S100, and records the destination in the RAM, etc.

Thereafter, by the function of the route searching part 210*c*, the control part 200 determines a cost for each road section in order to search for a route from a point of departure of the vehicle to the destination. The cost is determined at least at a stage of determining whether to select the road section. Therefore, costs of road sections whose costs need to be referred to in the process of a route search may be sequentially determined, or costs of a plurality of road sections whose costs can be referred to may be determined in advance.

Here, a configuration in which costs of a plurality of road sections are determined in advance will be described. Therefore, in this case, the control part 200 identifies a plurality of road sections that are present between the point of departure and the destination and that can serve as a route. In this example, these plurality of road sections are cost calculation targets. The cost calculation targets may be any road section that can serve as a route, and for example, a configuration is adopted in which road sections present within a predefined distance from the point of departure, road sections present within a predefined distance from the destination, and road sections present within a predefined distance from a straight line extending from the point of departure to the destination are considered cost calculation targets. Needless to say, if a situation occurs in which a road section whose cost has not been determined yet can be selected in the process of a route search, a cost of the road section is determined and then the route search continues.

Then, by the function of the type-of-item obtaining part 210*a*, the control part 200 obtains types of items (step S110). Namely, the control part 200 obtains all types of items to be loaded on the route-search-target vehicle, based on the travel plan information 300*a*. For example, when artwork having the possibility of breakage and precision equipment such as a computer are loaded on the vehicle, the control part 200 obtains a valuable and precision equipment as the types of items to be loaded.

Then, by the function of the route searching part 210*c*, the control part 200 obtains a cost coefficient based on the types of items (step S115). In the present embodiment, since the magnitude of the cost coefficient varies depending on the type of an item, the control part 200 compares cost coefficients associated with the items to be loaded on the vehicle and thereby identifies a maximum value, and obtains the maximum value as the cost coefficient. The maximum cost coefficient value is identified based on the cost information 300*d*. Namely, in the cost information 300*d*, as exemplified in Table 2, a cost coefficient is defined so as to be associated with the type of an item and a factor that is highly likely to cause damage to the item.

Hence, the control part 200 identifies which one of a bad road, a steep slope, a sharp bend, and a high accident rate a cost-calculation-target road section corresponds to, by referring to the map information 300*c*. When the cost-calculation-target road section corresponds to any one of the factors including a bad road, a steep slope, a sharp bend, and a high accident rate, the control part 200 obtains a cost coefficient based on the corresponding factor and the types of items obtained at step S110. For example, when the cost-calculation-target road section corresponds to a bad road, the types of items are a valuable and precision equipment, and the cost information 300*d* is in a state such as that of Table 2, the control part 200 compares the cost coefficient "1.7" of the valuables for the "bad roads" with the cost coefficient "1.8" of the precision equipment for the "bad roads". Then, the control part 200 obtains 1.8 as the cost coefficient of the cost-calculation-target road section.

When the cost-calculation-target road section does not correspond to any of a bad road, a steep slope, a sharp bend, and a high accident rate, the control part 200 considers that the cost of the cost-calculation-target road section is a default cost. The road section whose cost is considered a default cost does not serve as a target for a cost adjustment (step S130) which will be described later. At any rate, the control part 200 performs a cost coefficient obtaining process and a cost determination process such as those described above for each of cost-calculation-target road sections.

Then, by the function of the route searching part 210*c*, the control part 200 obtains a travel track record (step S120). Namely, the control part 200 obtains travel track record information 300*b* associated with identification information of the route-search-target vehicle from the recording medium 300, and records the travel track record information 300*b* in the RAM which is not shown, etc.

Then, by the function of the route searching part 210*c*, the control part 200 obtains driver's driving skills (step S125). Namely, the control part 200 identifies a type of an item associated with the maximum cost coefficient value obtained at step S115. For example, when the cost coefficient "1.7" of the valuables for the "bad roads" is compared with the cost coefficient "1.8" of the precision equipment for the "bad roads", by which the cost coefficient "1.8" is obtained, the control part 200 obtains precision equipment.

Then, the control part 200 obtains, based on the type of an item, a driving skill for each of operation that is likely to cause damage to the item by referring to the travel track record information 300*b*. For example, when the type of an item is precision equipment, by referring to the travel track record information 300*b* exemplified in Table 1, the control part 200 obtains 50/2000 as a driving skill for the exceeding of speed limits on bad roads. In addition, the control part 200 obtains 40/2000 as a driving skill for sudden acceleration and sudden deceleration on steep slopes, obtains 10/2000 as a driving skill for sudden steering at sharp bends, and obtains 0 as a driving skill for accidents.

Then, by the function of the route searching part 210*c*, the control part 200 compares a corresponding driving skill with threshold values to adjust the cost coefficient (step S130). Namely, the control part 200 identifies which one of the factors including a bad road, a steep slope, a sharp bend, and a high accident rate the cost-calculation-target road section corresponds to, by referring to the map information 300*c*. When the cost-calculation-target road section corresponds to any one of the factors including a bad road, a steep slope, a sharp bend, and a high accident rate, the control part 200 identifies operation associated with the factor. For example, when the cost-calculation-target road section corresponds to a bad road, operation associated with the factor is the exceeding of speed limits on bad roads.

Then, the control part 200 compares threshold values associated with the operation with the driving skill, and multiplies the cost coefficient obtained at step S115 by a value obtained by the comparison, and thereby adjusts the cost coefficient. For example, in an example shown in Table 3, when the cost-calculation-target road section corresponds to a bad road, operation associated with the factor is the exceeding of speed limits on bad roads, and the control part 200 obtains 0.02 as the first threshold value, 0.04 as the second threshold value, and 0.06 as the third threshold value. In this case, when the driving skill for the exceeding of speed limits on bad roads is 50/2000=0.025, the control part 200 multiplies the cost coefficient by a factor of 1.1 based on the fact that 0.025 is between the first threshold value and the second threshold value.

When the cost-calculation-target road section does not correspond to any of a bad road, a steep slope, a sharp bend, and a high accident rate, the control part 200 does not adjust the cost coefficient. The control part 200 performs a cost coefficient adjustment process based on the travel track record such as that described above, for each of the cost-calculation-target road sections.

When cost coefficients of road sections that serve as candidates for a route in a route search are obtained in the above-described manner, by the function of the route searching part 210c, the control part 200 searches for a route (step S135). Namely, the control part 200 searches for a route from the point of departure to the destination using an algorithm such as Dijkstra's algorithm, based on the costs determined at step S115 and S130.

Figure 3A:
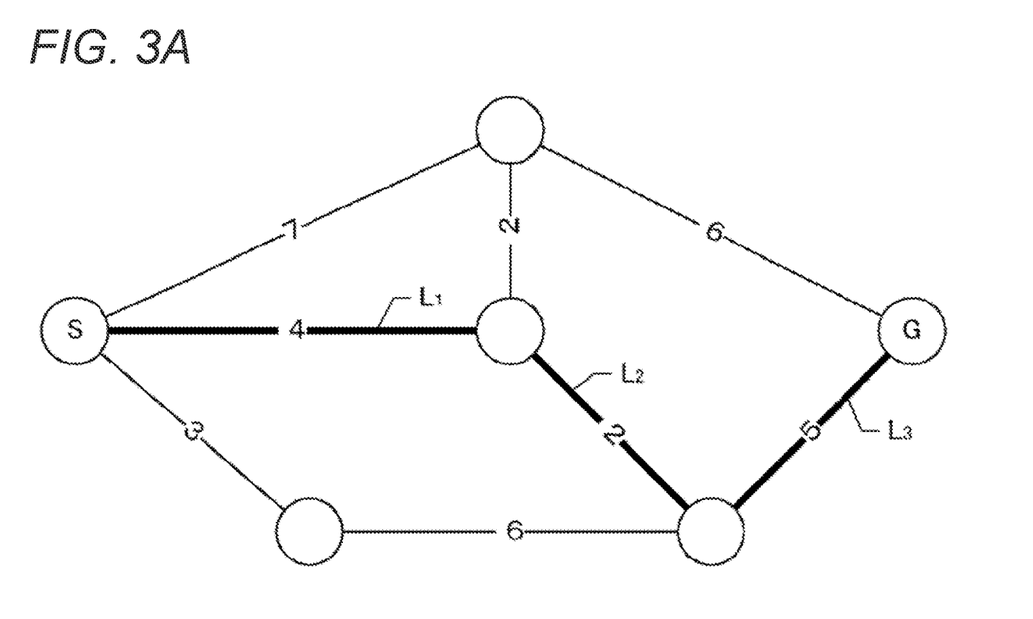
FIGS. 3A and 3B are diagrams showing examples of a route search.
Figure 3B:
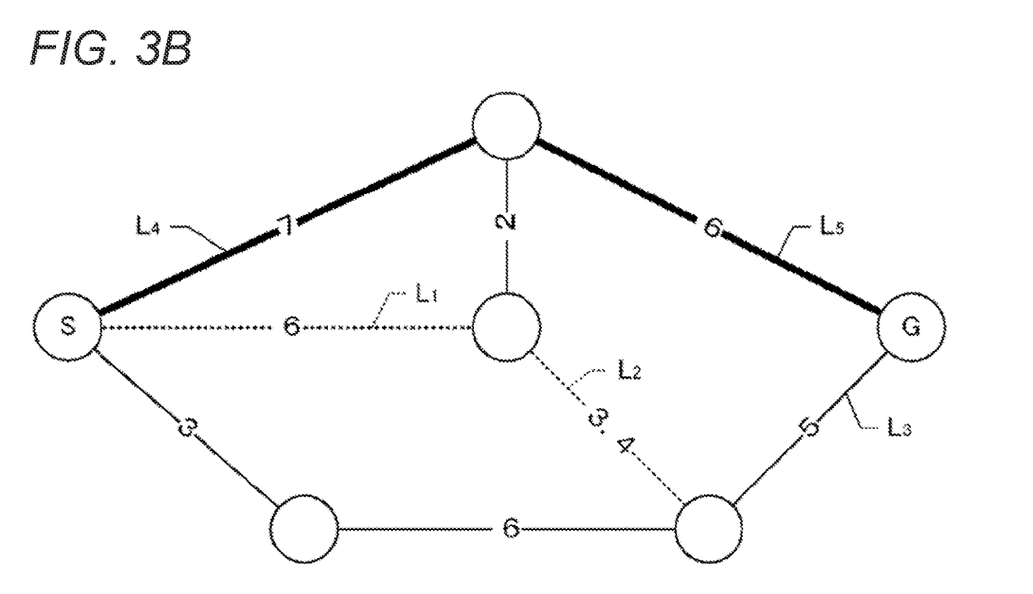

FIGS. 3A and 3B are diagrams showing examples of a route search according to the present embodiment. In these diagrams, a node is represented by an open circle and a link is represented by a solid line, and a cost is shown over the link. In addition, a node at a point of departure is S and a node at a destination is G. In addition, costs shown in FIG. 3A are default costs, and costs shown in FIG. 3B are costs obtained after multiplication by cost coefficients.

When a route is searched based on the default costs shown in FIG. 3A, by minimizing the sum of costs, a route running through road sections $L_1$, $L_2$, and L; is searched. FIG. 3B shows an example of a case in which a valuable is loaded on a vehicle, the road section $L_1$ includes a steep slope, and the road section $L_2$ is a bad road. Namely, when the type of an item is a valuable, the cost coefficient of a road section including a steep slope is 1.5, and thus, the cost of the road section $L_1$ whose default cost is 4 results in 6. In addition, when the type of an item is a valuable, the cost coefficient for bad roads is 1.7, and thus, the cost of the road section $L_2$ whose default cost is 2 results in 3.4. In FIG. 3B, road sections that are multiplied by cost coefficients are represented by dotted lines.

As a result, the sum of costs is smaller for a route running through road sections $L_4$ and $L_5$ than the route running through the road sections $L_1$, $L_2$, and $L_3$. Therefore, when the type of an item is a valuable, the route running through the road sections $L_4$ and $L^5$ is obtained as a result of the search. Hence, a road with a low possibility of damaging the item is searched as a route and a driver of the vehicle travels the route, by which the possibility of damaging the item can be reduced.

(3) Other Embodiments

The above-described embodiment is an example for carrying out the preferred embodiment, and various other embodiments can also be adopted as long as a route is selected by selecting a road with a low possibility of damaging items on a priority basis over a road with a high possibility of damaging items. For example, the travel track record information 300b shown in Table 1 is an example and is not limited to this example. Operation that is likely to cause damage to items is not limited to that shown in Table 1, and sudden steering on bad roads, etc., may be considered operation that is likely to cause damage to items.

The cost coefficients shown in Table 2 are also examples and are not limited to the examples. For example, the types of items may be classified in more details, and classification may be performed from other points of view. Factors that cause damage to items are not limited to the examples shown in Table 2, either. The threshold values and the values such as a factor of 1.5 adjusted based on the threshold values which are shown in Table 3 are not limited to these examples, either.

Each system included in the above-described embodiment may be composed of a smaller number of devices that share functions therebetween. As such an example, there is an example in which at least one system shown in FIG. 1 is composed of the same device as one or more other systems. For example, the route guiding system 10 and the operation manager terminal 50 may be composed of an integrated device, or the route searching system 100 and the operation manager terminal 50 may be composed of an integrated device, or the route searching system 100 and the route guiding system 10 may be composed of an integrated device.

Needless to say, the route guiding system 10 may be provided on a vehicle or may be a portable terminal, etc. Furthermore, the systems shown in FIG. 1 may be composed of a larger number of systems. For example, the route searching system 100 may be composed of a cloud server. Furthermore, a configuration may be adopted in which the operation manager terminal 50 accesses the route searching system 100, and travel plan information 300a is created under the control of the route searching system 100.

In addition, at least one of the parts (the type-of-item obtaining part 210a, the destination obtaining part 210b, and the route searching part 210c) included in the route searching system 100 may be present in a plurality of different devices. For example, a configuration may be adopted in which the function of obtaining costs in the route searching part 210c is implemented by the route searching system 100, and the function of searching for a route in the route searching part 210c is implemented by the route guiding system 10.

In addition, a configuration in which a part of the configuration of the above-described embodiment is omitted, or a configuration in which a process is changed or omitted can also be assumed. For example, a configuration may be adopted in which costs are identified based on the possibility of damaging items without taking into account travel track record information 300b. In this case, a configuration related to the travel track record information 300b may be omitted.

The type-of-item obtaining part may have any configuration as long as the types of items transported by a vehicle can be obtained. Namely, there are various types of items, and the possibility of damage and a cause of damage can vary depending on the item. Hence, the types of items are classified in advance such that items of the same type have the same or similar possibility of damage to items on roads, and items of different types have different possibilities of damage to items on roads. The types of items may be identified by the operation manager as in the above-described embodiment, or may be identified by others, e.g., a vehicle driver. At any rate, the type-of-item obtaining part may have any configuration as long as information indicating identified types of items can be obtained.

The destination obtaining part may have any configuration as long as a destination can be obtained. Namely, the destination obtaining part may have any configuration as long as a vehicle's arrival point can be obtained as a destination. The destination may be a plurality of points including a stopping destination and a final destination, and may include a point where loading and unloading of items are not performed. An example of the latter case is a vehicle's base to which a vehicle returns with no item loaded on the vehicle, after unloading items.

The route searching part may have any configuration as long as a route that reaches a destination can be searched by selecting, based on the types of items, a road with a low possibility of damaging the items on a priority basis over a road with a high possibility of damaging the items. Namely, the route searching part may have any configuration as long as a road can be selected based on the possibility of damaging items, in the process of searching for a route. Needless to say, a route search may take into account other elements, e.g., distance, travel time, and a road type.

The possibility of damaging items may be defined in any manner as long as the possibility can be relatively compared between arbitrary roads. Therefore, in addition to a configuration in which the possibility of damaging items is defined based on costs as in the above-described embodiment, various configurations may be adopted. For example, a configuration may be adopted in which road sections are classified in advance into road sections that are likely to cause damage to items and road sections with a low possibility of causing damage.

The possibility of damaging items may be identified by various elements, and may be identified by static information about a road such as a road shape, or may be identified by dynamic information about a road such as the state or statistics on the road. Examples of the former case include a configuration in which the more the road shape differs from a straight-line and flat shape, the higher is considered the possibility of damaging items, and a configuration in which the possibility of damaging items is considered to be higher for a case of a narrow road width than a case of a wide road width.

An example of the latter case includes a configuration in which the possibility of damaging items is considered to be higher for a case of poor road surface conditions (a relatively large number of bumps and dips, under construction, unpaved, etc.) than a case of excellent road surface conditions. In addition, an example includes a configuration in which the possibility of damaging items is considered to be higher when the probability of occurrence of an accident or the probability of damage to items on a road is higher than that of other roads. In addition, a road on which an item has been damaged in the past may be considered a road with a high possibility of damaging an item. Needless to say, in this case, it may be considered that the larger the number of occurrences of damage to items, the higher the possibility of damaging items.

Note that although in the above-described embodiment the degree of selection of a road on a priority basis based on the possibility of damaging items is defined as a cost, needless to say, the possibility of damaging items may be defined for each road, and a road may be searched based on the possibilities. The possibility of damaging items and the degree of selection of a road on a priority basis may change in a stepwise manner or may change continuously. At any rate, any configuration may be adopted as long as a road serving as a route can be selected based on these possibilities and degrees.

When a road with a low possibility of damaging items is selected on a priority basis, a road is selected based on the type of items so as to reduce the possibility of damaging items of this type. Therefore, in a case in which two road sections that can be selected as a route extend from a given intersection, when one road section has a lower possibility of damaging items than the other, the one road section is selected as a route.

Note, however, that selection of a route can take into account various elements such as the distances and average travel time of road sections. Therefore, if elements other than the possibility of damaging items differ, then a road section to be selected can vary, but when the elements other than the possibility of damaging items are fixed, a road with a low possibility of damaging items serves as a route on a priority basis. Note that selection of a road is performed for each type of items. Therefore, a situation can occur in which a specific road section is selected on a priority basis for items of a given type, but the specific road section is not necessarily selected on a priority basis for items of other types.

The degree of selection of a road with a low possibility of damaging items changes based on the type of an item, and may change depending on whether there is an item, or the types of items may be classified into a plurality of types and the degree may change depending on each type. An example of the latter case includes a configuration in which a comparison in how easy an item is damaged is made between the types of items, and the possibility of selecting a road with a high possibility of damaging items is lower for items that are more easily damaged. Needless to say, the possibility of damaging items may be identified by different elements for different types of items, or may be identified by a common element.

Furthermore, a route search that takes into account the possibility of damaging items may be performed for a part of a vehicle route. For example, when a route that a vehicle travels from a point of departure to an item transport completion point with items loaded thereon and returns to the point of departure after unloading the items is assumed, the route searching part may search for a route that reaches a destination which is the item transport completion point by selecting a road with a low possibility of damaging the items on a priority basis. In this case, when a route from the transport completion point to a destination after the transport completion point is searched, the route searching part does not perform a search that selects a road with a low possibility of damaging items on a priority basis.

Namely, a configuration may be adopted in which a route with items loaded is searched using costs by which a road with a low possibility of damaging items is likely to be selected, and a route with no item loaded is searched using default costs. For example, in the examples shown in FIGS. 3A and 3B, an example is assumed in which a route from the point of departure S to the point G which is an item transport destination is as shown in FIG. 3B, and a route returning to the point of departure S from the point G is as shown in FIG. 3A. According to this configuration, a search can be performed such that the vehicle passes through a route that reduces the possibility of damaging items while the items are loaded, and passes through a route that gives priority to other elements (short distance or short travel time, etc.) while the items are not loaded. Needless to say, whether to perform, after unloading items, a route search taking into account the possibility of damaging items may be able to be specified by a user using various types of user interfaces.

Furthermore, for guidance modes of the route guiding system 10, various modes can be adopted. For example, a configuration may be adopted in which when a route includes a road with a high possibility of damaging items, by the function of the route guiding part 21b, the control part 20 provides guidance on the road before reaching the road. Namely, according to the present embodiment, a route is searched such that a road with a high possibility of damaging items is avoided as much as possible. However, there is also a case in which a route includes a road with a high possibility of damaging items for a reason, e.g., there are very few options for a road on actual roads.

Figure 4:
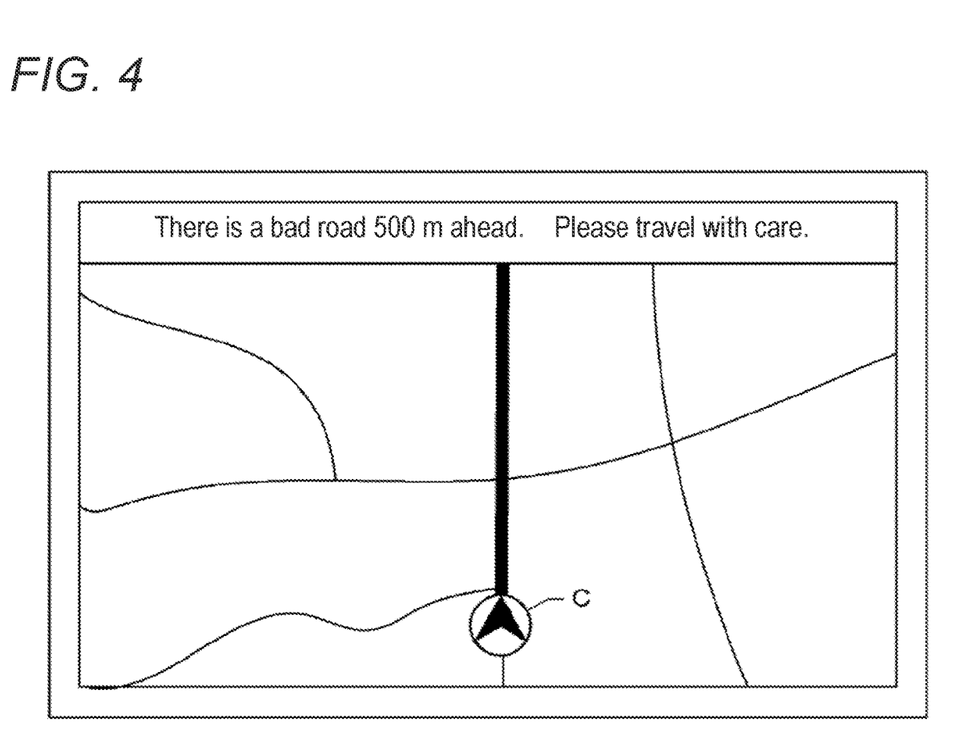
FIG. 4 is a diagram showing an example of a warning.

Hence, in such a case, a warning may be given to a driver. FIG. 4 is a diagram showing an example of a warning displayed on an output part of a user I/F part (not shown) included in the route guiding system 10. Namely, in this example, a map of an area around a vehicle's current location C is displayed and a route is represented by a thick solid line. In this situation, when there is a bad road 500 m ahead on the route, a warning about the presence of a bad road 500 m ahead is given. According to this configuration, the driver can be aware in advance that he/she will pass through a bad road, and can reduce the possibility of damaging items by driving carefully, etc.

Note that a reference that considers that the possibility of damaging items is high is determined in advance, and is determined by, for example, whether a value that directly or indirectly corresponds to the possibility of damaging items is greater than or equal to a threshold value. For example, a configuration can be adopted in which a road section whose cost coefficient is greater than or equal to a threshold value is considered to have a high possibility of damaging items. Furthermore, when a route includes a road with a high possibility of damaging items, vehicle control to reduce the possibility of damaging items may be performed. For example, a configuration can be adopted in which when a route includes a road with a high possibility of damaging items, if the road is a bad road or a road with a steep slope, a sharp bend, or a high accident rate, then control to suppress vehicle speed to a level less than or equal to a predefined value is performed. Needless to say, what to control is not limited to vehicle speed limits and may be vehicle's traveling direction control that allows the vehicle to travel along the curvature of a bend, etc.

Furthermore, a technique for selecting a route by selecting a road with a low possibility of damaging items on a priority basis over a road with a high possibility of damaging items as in the preferred embodiment can also be applied as a program and a method. In addition, systems, programs, and methods such as those described above may be implemented as a single device or may be implemented using a component shared with each part included in a vehicle, and include various types of modes. For example, it is possible to provide methods and programs that are implemented by systems such as those described above. In addition, changes can be made as appropriate, e.g., a part is software and a part is hardware. Furthermore, the invention is also feasible as a recording medium for a program that controls a device. Needless to say, the recording medium for software may be a magnetic recording medium or may be a semiconductor memory, and any recording medium to be developed in the future can also be considered exactly in the same manner.

REFERENCE SIGNS LIST

10: Route guiding system, 15: Communication part, 16: GNSS receiving part, 17: Vehicle speed sensor, 18: Gyro sensor, 20: Control part, 21: Route guiding program, 21a: Route obtaining part, 21b: Route guiding part, 50: Operation manager terminal, 52: Control part, 54: User I/F part, 55: Communication part, 100: Route searching system, 200: Control part, 210: Route searching program, 210a: Type-of-item obtaining part, 210b: Destination obtaining part, 210c: Route searching part, 300: Recording medium, 300a: Travel plan information, 300b: Travel track record information, 300c: Map information, 300d: Cost information, and 400: Communication part

The invention claimed is:
1. A route searching system for a vehicle, comprising:
a first communication circuit configured to communicate with a route guiding system in the vehicle and an operation manager terminal, wherein:
   the route guiding system includes:
      a second communication circuit configured to communicate with the first communication circuit;
      a vehicle speed sensor configured to detect a speed of the vehicle;
      a gyro sensor configured to detect an angular acceleration of the vehicle; and
      a GNSS (Global Navigation Satellite System) receiver configured to receive signals usable for position detection; and
   the operation manager terminal includes:
      a third communication circuit configured to communicate with the first communication circuit; and
      a user interface;
a memory storing:
   type-of-item information indicating types of items to be transported by the vehicle, the type-of-item information having been received by the first communication circuit from the third communication circuit after having been input via the user interface;
   travel plan information indicating a destination of the vehicle, the travel plan information having been received by the first communication circuit from the third communication circuit after having been input via the user interface;
   cost coefficient values for each of the types of items to be transported where, for each of the types of items, a cost coefficient is stored for each of a plurality of road section types; and
   map information including road sections, the road sections being defined by node data, shape interpolation point data, and link data;
a processor programmed to:
   access the stored type-of-item information to determine the types of items to be transported;
   access the indicated destination to which the vehicle will travel from the stored travel plan information; and
   access the stored the cost coefficient values for each of the plurality of road section types for each of the types of items to be transported by the vehicle;
   search for a route to the indicated destination by:
      receiving a current location of the vehicle by the first communication circuit from the second communication circuit after having been detected using the GNSS receiver;
      accessing the stored map information and identifying a plurality of candidate road sections to be part of the route based on the received current location and the indicated destination;
      determining a road section type for each of the plurality of candidate road sections;

based on the determined road section types and the types of items to be transported, accessing the stored cost coefficient values to determine a maximum cost coefficient for each of the plurality of candidate road sections;

based on the determined maximum cost coefficient for each of the plurality of candidate road sections, adjusting a route search cost for each of the plurality of candidate road sections; and searching for the route from the received current location to the indicated destination using the adjusted route search cost for each of the plurality of candidate road sections; and transmit the route to the route guiding system from the first communication circuit to the second communication circuit to provide guidance for the vehicle.

2. The route searching system according to claim 1, wherein:

the memory further stores travel track record information indicating one or more of exceeding of a speed limit by the vehicle, sudden acceleration of the vehicle on a steep slope, sudden deceleration of the vehicle on a steep slope, sudden steering by the vehicle in a sharp bend, and an accident of the vehicle, the travel track record information having been received by the first communication circuit from the second communication circuit after having been recorded by the route guiding system based on signals from the vehicle speed sensor and the gyro sensor; and the processor is programmed to:

access the stored travel track record to determine a skill level of a driver of the vehicle; and adjust the maximum cost coefficient for each of the plurality of candidate road sections based on the driving skill level of the driver of the vehicle.

3. The route searching system according to claim 1, wherein:

the indicated destination is a transport completion point of at least one of the types of items to be transported by the vehicle, and after the route is transmitted, any subsequent route search performed by the processor to a next destination to which none of the types of items will be transported does not adjust a route search cost based on the stored cost coefficient values.

4. A route searching system according to claim 1, wherein the stored cost coefficient values are based on an expected amount of acceleration acting on the vehicle due to at least one of road surface conditions and a road shape.

5. The route searching system according to claim 4, wherein the expected amount of acceleration is an up-down acceleration caused by road surface conditions.

* * * * *